J. Wesley.
Hoop Skirt.
N° 25374. Patented Sep. 6, 1859.
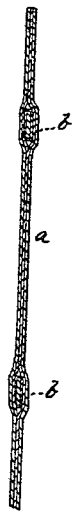
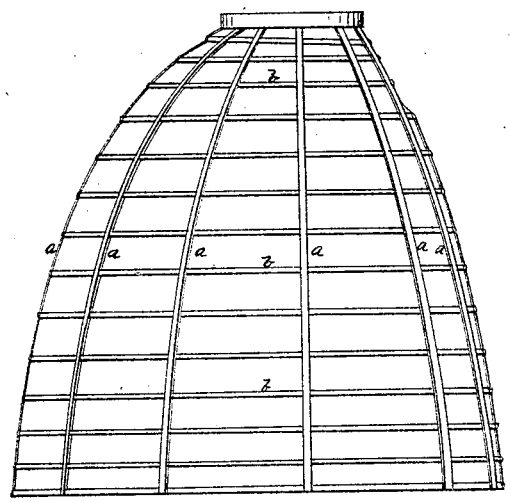
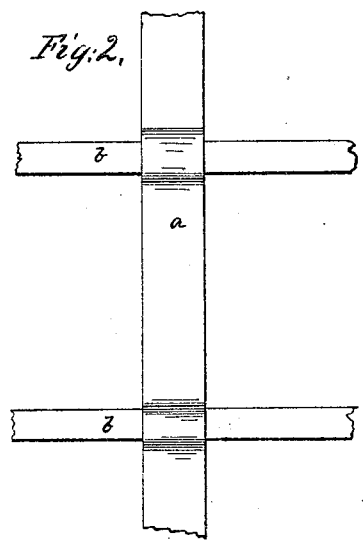
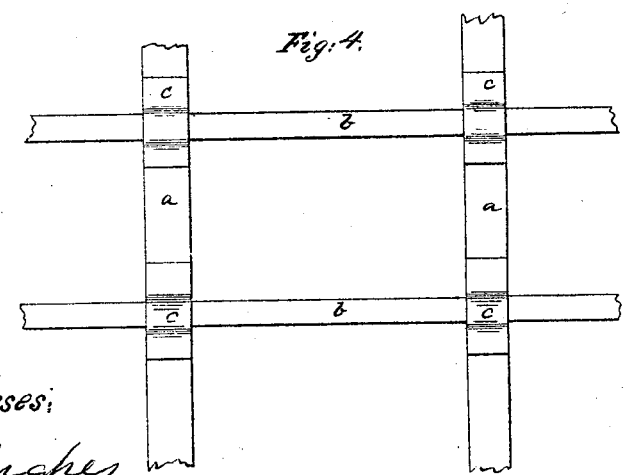
Witnesses:
Inventor:

UNITED STATES PATENT OFFICE.

JOSEPH WESLEY, OF PROVIDENCE, RHODE ISLAND, ASSIGNOR TO JOS. B. WESLEY, OF SAME PLACE.

SKELETON SKIRT.

Specification of Letters Patent No. 25,374, dated September 6, 1859.

*To all whom it may concern:*

Be it known that I, JOSEPH WESLEY, of the city of Providence, in the county of Providence and State of Rhode Island, have invented a new and Improved Hoop-Skirt; and I do hereby declare that the following is a full, clear, and exact description of the same, reference being had to the accompanying drawings, forming part of this specification, in which—

Figure 1, is a side view of my improved skirt. Fig. 2, is an outside view of a portion of one of the straps and of two of the hoops. Fig. 3, is a section corresponding with Fig. 2, taken lengthwise through the strap. Fig. 4, is an inside view of two straps and two hoops showing a modification of the invention. Fig. 5, is a section corresponding with Fig. 4, taken longitudinally through one of the tapes.

Similar letters of reference indicate corresponding parts in the several figures.

The nature of my invention consists in a new article of manufacture—to wit: a skirt having its hoops supported by tapes or straps or intermediate connections, which are rendered adhesive by the application of caoutchouc or gutta percha in the manner and for the purpose substantially as hereinafter described.

The method of making the skirt which I prefer is that represented in Figs. 2 and 3, in which the straps $a$, $a$, are made double or of two plies throughout their whole length. This method is as follows: I take for the straps, tape or narrow strips of suitable fabric and coat all over on one side with india rubber in an adhesive condition in any of the modes practiced in the manufacture of india rubber goods, or with a solution of india rubber; or I coat a piece of cloth in the same way and afterward cut it into strips of suitable width for the straps. I then place the required number of pieces of tape or strips, of suitable length to form the straps, at regular or suitable intervals apart upon the skirt form, with the india-rubber outward and place upon the form, outside of them, and at suitable distances apart, the required number of hoops $b$, $b$, and afterward place upon the outside of the hoops and upon the first tapes or strips other similarly prepared tapes or strips with their india rubber coated sides next to the hoops and to the india rubber coated sides of the first mentioned tapes or strips, or, instead of making the inner and outer plies of the straps of separate pieces, I use pieces long enough to fold over the bottom hoop and return to the top of the form. I then press together the two plies of the straps and press them upon the hoops, by rolling the straps longitudinally with a hand roller, such as is commonly used for pressing together and causing the adhesion of india-rubber surfaces and thus cause the union of the two plies of the straps and of each ply with the hoop as shown in Fig. 3, where the india rubber is represented in red color; and so secure the hoops firmly in every direction to the straps without any necessity for sewing or for the use of metallic fastenings.

In the method of making the skirt represented in Figs. 4 and 5, the straps $a$, $a$, are only double or two-ply at and near their connection with the hoops, each being composed of a single tape or strip extending the whole length of the skirt and coated with india-rubber on the side next the hoops, at and for a short distance above and below where the hoops cross, and the hoops being covered on the opposite sides by short pieces $c$, $c$, of tape or other fabric, coated with india rubber on their inner sides to cause their adhesion to the hoops and the portions of the straps immediately above and below. This method of making the skirt is however more difficult and makes a less durable skirt. The straps may be united to the waist band either by sewing, eyeleting or any of the usual modes or by the use of india rubber as a cement.

In order to destroy any unpleasant smell from the gums I propose, in the preparation of the same for use, to introduce some suitable disinfecting agent such as sassafras, and thus impart to the skirt a very agreeable odor.

I do not claim forming a compound cloth by bringing the india rubber coated surfaces of two strips of cloth together, nor do I claim the use of adhesive rubber, &c., as a mode of fastening in itself considered—but, What I do claim as my invention and desire to secure by Letters Patent is—

A new article of manufacture—to wit: a skirt having its hoops supported by tapes, or straps which are rendered adhesive by the application of caoutchonc or gutta percha in the manner and for the purpose substantially as herein described.

JOSEPH WESLEY.

Witnesses:
  Mich. Hughes,
  M. M. Livingston.